United States Patent
Lin et al.

(10) Patent No.: US 6,865,468 B2
(45) Date of Patent: Mar. 8, 2005

(54) METHOD AND APPARATUS FOR VEHICLE STABILITY ENHANCEMENT SYSTEM

(75) Inventors: William C. Lin, Troy, MI (US); Shih-Ken Chen, Troy, MI (US); Yuen-Kwok Chin, Troy, MI (US); Weiwen Deng, Rochester Hills, MI (US); David S. Rule, Waterford, MI (US); David P. Lynch, West Bloomfield, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/305,378

(22) Filed: Nov. 26, 2002

(65) Prior Publication Data

US 2004/0102886 A1 May 27, 2004

(51) Int. Cl.[7] .......................... G06F 17/00; G06F 7/00; B60K 17/34
(52) U.S. Cl. ........................ 701/70; 701/41; 180/408
(58) Field of Search .......................... 701/41, 69, 42, 701/70, 72, 91, 48, 36, 37; 180/197, 408, 233, 252, 253, 280, 282, 423, 410, 446

(56) References Cited

U.S. PATENT DOCUMENTS

| | | | | |
|---|---|---|---|---|
| 4,715,466 A | * | 12/1987 | Ishii et al. ................... 180/233 |
| 5,019,982 A | * | 5/1991 | Furukawa ..................... 701/41 |
| 5,208,751 A | * | 5/1993 | Berkefeld ..................... 701/41 |
| 5,316,098 A | * | 5/1994 | Akita et al. .................. 180/415 |
| 5,508,921 A | * | 4/1996 | Chikuma et al. ...... 364/424.05 |
| 5,524,079 A | | 6/1996 | Ishida et al. ........... 364/424.05 |
| 5,615,117 A | * | 3/1997 | Serizawa ..................... 701/42 |
| 5,627,754 A | * | 5/1997 | Asanuma et al. ............. 701/41 |
| 5,720,533 A | | 2/1998 | Pastor et al. ................. 303/147 |
| 5,746,486 A | | 5/1998 | Paul et al. ................... 303/146 |
| 6,041,886 A | | 3/2000 | Nakaishi et al. ............ 180/444 |
| 6,112,147 A | | 8/2000 | Ghoneim et al. | |
| 6,125,319 A | | 9/2000 | Hac et al. ..................... 701/80 |
| 6,161,905 A | | 12/2000 | Hac et al. ................... 303/146 |
| 6,169,951 B1 | | 1/2001 | Ghoneim et al. ............. 701/70 |
| 6,175,790 B1 | | 1/2001 | Lin et al. ...................... 701/36 |
| 6,195,606 B1 | | 2/2001 | Barta et al. ................... 701/70 |
| 6,205,391 B1 | | 3/2001 | Ghoneim et al. ............. 701/70 |
| 6,226,581 B1 | * | 5/2001 | Reimann et al. ............. 701/48 |
| 6,553,293 B1 | * | 4/2003 | Hac ........................... 701/42 |
| 6,640,171 B2 | * | 10/2003 | Chen et al. ................... 701/41 |

FOREIGN PATENT DOCUMENTS

EP  0510365 A2 * 3/1992

OTHER PUBLICATIONS

Furukawa, Yoshimi et al., "A Review of Four–Wheel Steering Studies from the Viewpoint of Vehicle Dynamics and Control" Nov. 1989.
Whitehead, John C., "Response and Stability of Rear Wheel Steering Vehicles" Nov. 1988.

* cited by examiner

Primary Examiner—Tan Q. Nguyen
Assistant Examiner—Dalena Tran
(74) Attorney, Agent, or Firm—Kathryn A. Marra

(57) ABSTRACT

A vehicle stability enhancement system for a vehicle having at least one vehicle subsystem includes at least one sensor for sensing at least one vehicle parameter, at least one vehicle control system for adjusting the at least one vehicle subsystem wherein the at least one vehicle control system includes a rear wheel steering control system, at least one memory including at least one set of gain factors, and a controller responsive to the at least one sensor and the at least one set of gain factors for controlling the at least one vehicle control system.

21 Claims, 10 Drawing Sheets

US 6,865,468 B2

METHOD AND APPARATUS FOR VEHICLE STABILITY ENHANCEMENT SYSTEM

TECHNICAL FIELD

This invention relates generally to a vehicle, and more particularly to a method and apparatus for stabilizing, the vehicle using a vehicle stability enhancement (VSE) system.

BACKGROUND

Traditional vehicle chassis subsystems, such as steering, braking and suspension subsystems, are passive, meaning that their responsiveness under operating conditions is determined prior to the vehicle leaving the point of manufacture. Advances in braking system technology have led to differential braking using vehicle yaw-rate feedback. Such advances have been incorporated into vehicle stability enhancement systems, whereby an onboard controller monitors the vehicle yaw rate, determines an appropriate control command to improve vehicle directional stability, and effectuates actuation of appropriate braking mechanisms to create a corrective yaw moment. Such vehicle stability enhancement systems typically result in a reduction of vehicle speed due to the action of the braking mechanisms.

SUMMARY

In one embodiment, a vehicle stability enhancement system for a vehicle having at least one vehicle subsystem includes at least one sensor for sensing at least one vehicle parameter, at least one vehicle control system for adjusting the at least one vehicle subsystem wherein the at least one vehicle control system includes a rear wheel steering control system, at least one memory including at least one set of gain factors, and a controller responsive to the at least one sensor and the at least one set of gain factors for controlling the at least one vehicle control system.

In another embodiment, a method for controlling a vehicle stability enhancement system in a vehicle having at least one vehicle subsystem includes sensing at least one vehicle parameter, determining at least one control gain factor in response to the at least one vehicle parameter, determining the state of at least one control flag in response to the at least one vehicle parameter, calculating at least one control command in response to the at least one control gain factor and the at least one control flag, and actuating at least one vehicle control system in response to the at least one control command for adjusting the at least one vehicle subsystem.

BRIEF DESCRIPTION OF THE DRAWINGS

Referring now to the figures, which are exemplary embodiments, and wherein like elements are numbered alike.

DETAILED DESCRIPTION

A detailed description of an embodiment of the present invention is presented herein by way of exemplification and not limitation with reference to FIGS. 1–13.

Vehicle

Figure 1:
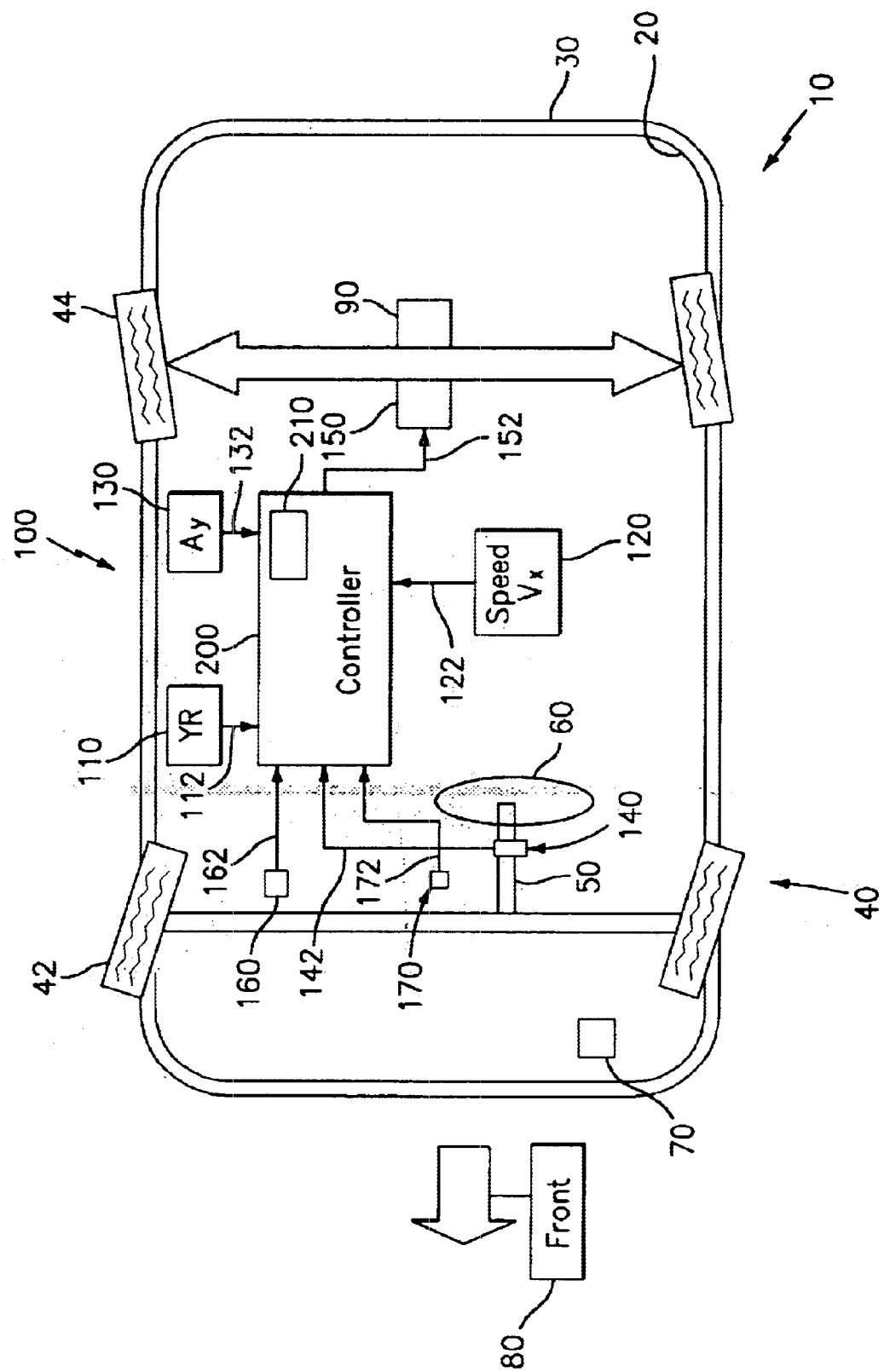
FIG. 1 depicts a generalized schematic of a vehicle operative for implementing the present invention.

FIG. 1 depicts a generalized schematic of a vehicle 10 having a chassis 20, a body 30 arranged on chassis 20, a set of wheels 40 rotationally coupled to chassis 20, a front wheel steering mechanism 50 arranged for steering front wheels 42, a steering wheel 60 for transferring a driver commanded steering torque to the steering mechanism 50, a rear wheel steering mechanism 90 arranged for steering rear wheels 44, and a control system 100. The front of vehicle 10 is depicted by arrow 80. Rear wheel steering mechanism 90 may be of the kind found in the rear wheel steer system of General Motors (GM) Sierra Denali pickup truck, Model-Year 2002. Steering mechanisms 50, 90 are alternatively referred to as a vehicle subsystems. The control system 100 includes the following sensors: a yaw rate sensor (YR) 110 for sensing the actual vehicle yaw rate; velocity sensor (VS) 120 for sensing the velocity of vehicle 10; a lateral acceleration sensor (Ay) 130, such as for example an accelerometer, for sensing the value of the vehicle's lateral acceleration; and a front wheel steering angle sensor (FWSS) 140 for sensing the angle of steer of front steering mechanism 50. The sensed parameters are alternatively referred to as vehicle parameters. The control system 100 also includes a rear wheel steering mechanism control system 150, alternatively referred to as a vehicle control system, which may include, for example, electronically controlled actuators and dampers, for adjusting the rear wheel steering mechanism 90. The control system 100 further includes: a two-wheel drive/four-wheel drive (2WD/4WD) mode selection switch 160 for selecting a two-wheel drive, where the vehicle is driven by wheels on one axle only regardless of the existence of a physical linkage between the driving wheels, or four-wheel drive driving mode where the vehicle is driven by wheels on more than one axle, a trailer mode selection switch 170 for selecting a driving mode that accounts for the presence or absence of a towed trailer; and a central controller 200 arranged in operable communication with sensors 110, 120, 130, 140, and vehicle control system 150. Control lines 112, 122, 132, 142, 152, 162, 172, are depicted, for simplicity, as single lines, but represent both signal communication lines and operational links for communicating with controller 200 and/or actuating the vehicle control system 150.

2WD/4WD mode selection switch 160 and trailer mode selection switch 170 may be a pushbutton type switch or a toggle type switch, or any other type of switch suitable for producing an appropriate mode selection signal. Switches 160, 170 may also include a display (not shown) for providing feedback to the driver regarding the driving mode selection. Controller 200 includes a memory 210 for storing sensor information, register information, flag settings, look-up tables of gain factors, and any other relevant information, as discussed below. The vehicle electrical system 70 provides electrical power to all of the vehicle's electrically operated systems, including the controller 200 and the vehicle control system 150.

It will be appreciated that while the disclosed embodiment refers to a vehicle, such as an automobile, having four wheels, the invention described herein is applicable to any vehicle with any number of wheels that may be arranged to employ rear wheel steering.

Nomenclature

The nomenclature used herein for implementing the present invention includes the following variables:

Parameters:
$C_f$=front cornering stiffness;
$C_r$=rear cornering stiffness;
a=distance from front axle to center of gravity;
b=distance from rear axle to center of gravity;
L=vehicle wheel base;
$I_z$=vehicle yaw inertia;
$K_u$=vehicle understeer coefficient (typically 6 deg/g lateral acceleration);
$V_x$=vehicle speed (kilometers-per-hour, kph);
$V_{th}$=vehicle speed threshold (kilometers-per-hour, kph), for example, 10-kph;
$\omega_n$=desired vehicle natural frequency;
$\zeta$=desired vehicle damping ratio (typically about 0.7);
$\delta_f$=front wheel steering angle;
$\delta_r$=open-loop rear wheel steering angle;
ORWSC=open-loop rear wheel steering angle command;
R/F=ratio of rear steering angle to front steering angle;
$G_{R/F}$=gain from ratio of rear steering angle to front steering angle;
YR=vehicle actual yaw rate, (degrees-per-second, deg/sec));
$A_y$=vehicle lateral acceleration (g-force);
$G_d$=yaw rate error gain (a constant, for example 0.01, or a function of vehicle speed);
$G_{pYR}$=proportional yaw rate control gain;
$G_{2WDYR}$=yaw rate gain multiplier for 2WD status, for example, 0.55;
$G_{4WDYR}$=yaw rate gain multiplier for 4WD status, for example, 1.00;
$G_{mYR}$=yaw rate gain multiplier depending on 2WD/4WD status;
$G_{pSR}$=proportional side-slip rate control gain;
$G_{2WDSR}$=side-slip rate gain multiplier for 2WD status, for example, 0.78;
$G_{4WDSR}$=side-slip rate gain multiplier for 4WD status, for example, 1.00;
$G_{mSR}$=side-slip rate gain multiplier depending on 2WD/4WD status;
T=control sampling time interval, for example, 10-milliseconds (msec);
Cntr=logic counter (a count of one equates to a time period of T);
$C_0$=predefined value for logic counter, for example, 500 (500*T=5 seconds);
$DB1_{YR}$=first deadband threshold for yaw rate;
$DB2_{YR}$=second deadband threshold yaw rate;
$DB1_{SR}$=first deadband threshold for side-slip rate;
$DB2_{SR}$=second deadband threshold side-slip rate.

Processes:
YRFB=yaw rate feedback;
SRFB=side-slip rate feedback;
$\mu e$=surface identification estimate;
CLQS4_YR=yaw rate control flag;
YRdes=yaw rate desired;
$YR_{cmd}$=yaw rate command;
SID=surface identification;
YRE=yaw rate error;
r*(s)=YRdes expressed in the frequency domain;
$RW_{YRd}$=rear wheel yaw rate derivative component;
$RW_{YRp}$=rear wheel yaw rate proportional component;
$RW_{YR}$=rear wheel yaw rate feedback control;
$\Delta r$=filtered yaw rate error;
$RW_{YRFB}$=rear wheel yaw rate feedback;
$V_{y\_dot}$=vehicle side-slip rate;
$RW_{SR}$=rear wheel side-slip rate component;
$RW_{SRFB}$=rear wheel side-slip rate feedback;
CLQS4_SR=side-slip rate control flag (indicates state of vehicle lateral acceleration relative to a threshold value);
RWSC=rear wheel steering command.

Quotations (" ") surrounding a variable name represents a register in memory 210 containing the value of the respective variable, "| |" designates an "absolute value" operator, and a single quotation (') following a variable name designates a "derivative" operator. A variable name presented in an equation represents a value associated with the respective variable, and a variable name presented in a process represents a command having a command signal associated with a related value stored in a register in memory 210. Accordingly, a process output results in a command having a command signal.

Controller Generally

Controller 200 is a microprocessor based control system adapted for controlling vehicle subsytems, and more particularly, for controlling the rear wheel steering mechanism 90 in accordance with control logic described herein. Controller 200 typically includes a microprocessor, a memory 210, such as, for example, ROM and RAM, and appropriate input and output circuits of a known type for receiving the various input signals and for outputting the various control commands to the various actuators and control systems. The control logic implemented by controller 200 is cycled at a control sampling rate of T, and is best seen by referring to FIGS. 2–11.

Figure 2:
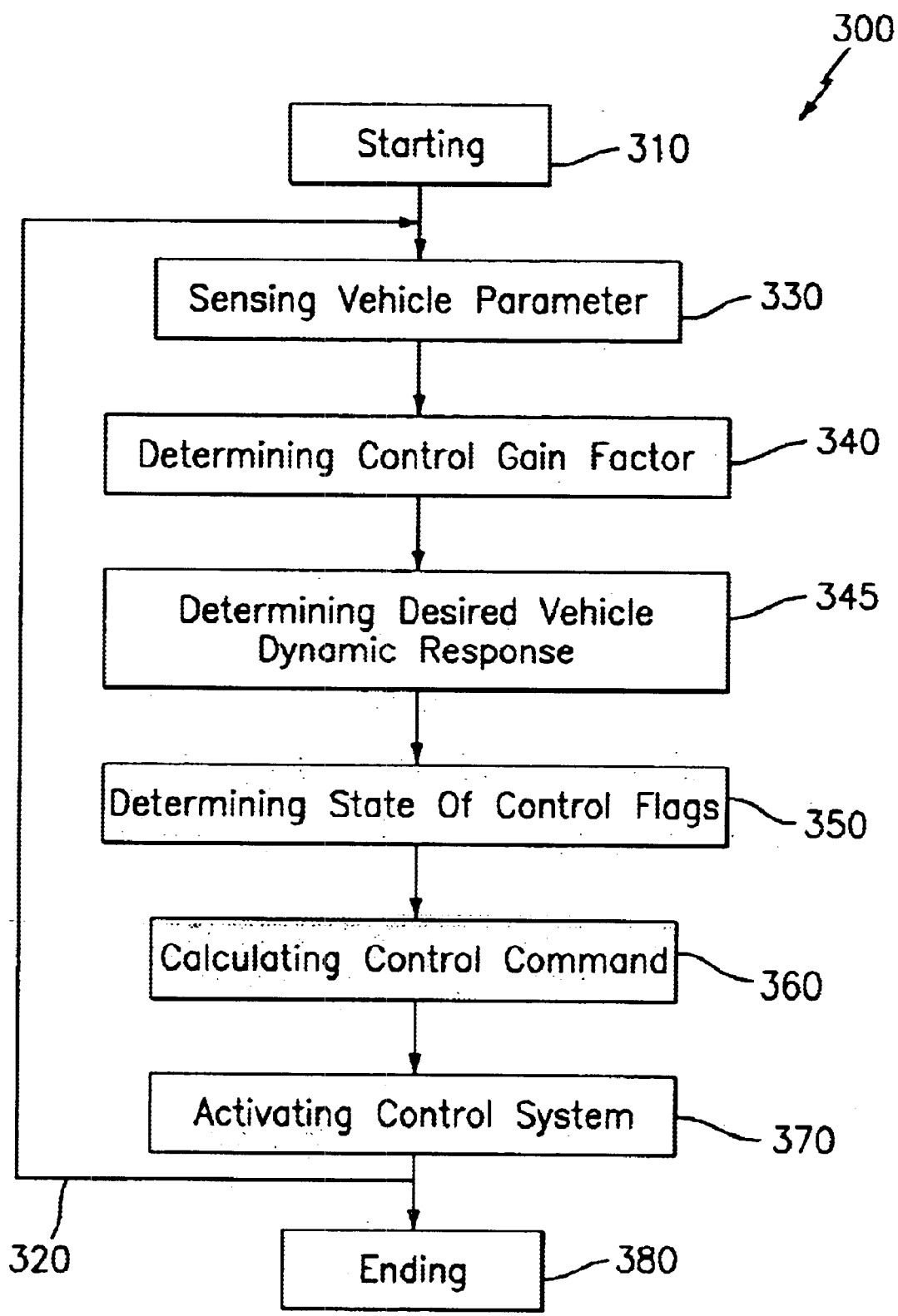
FIG. 2 depicts a generalized flowchart of a process for implementing the present invention.
Figure 3:
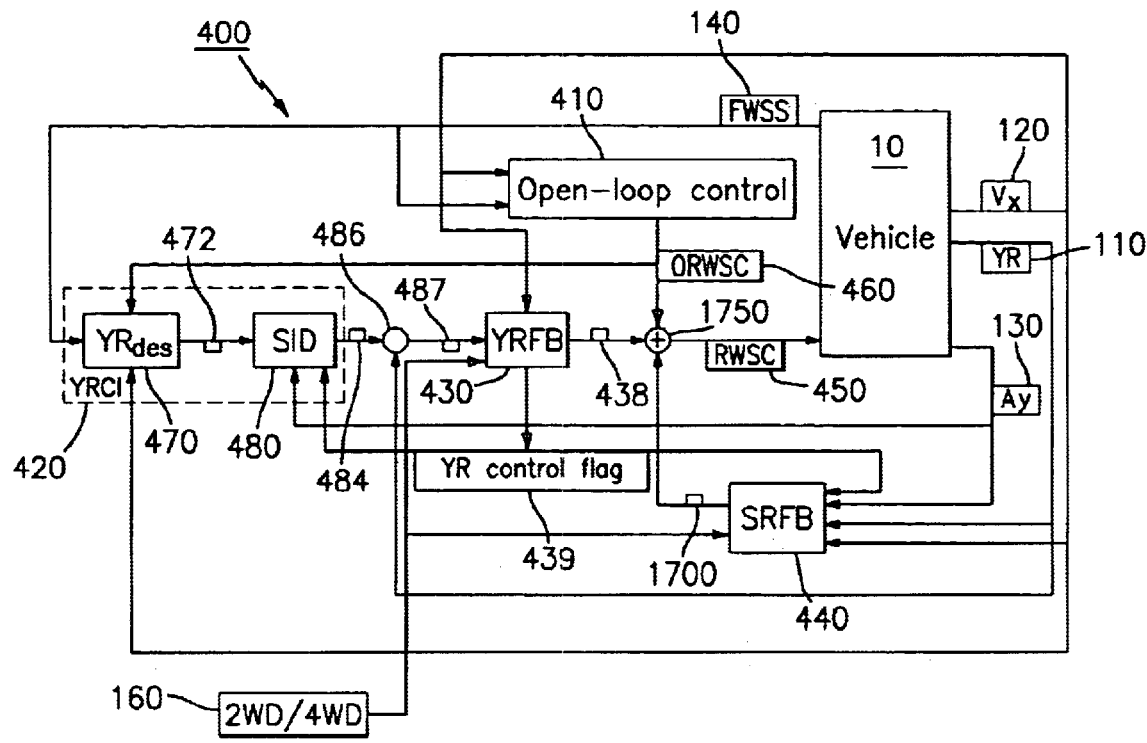
FIG. 3 depicts a block diagram of a control system for implementing the present invention.
Figure 4:
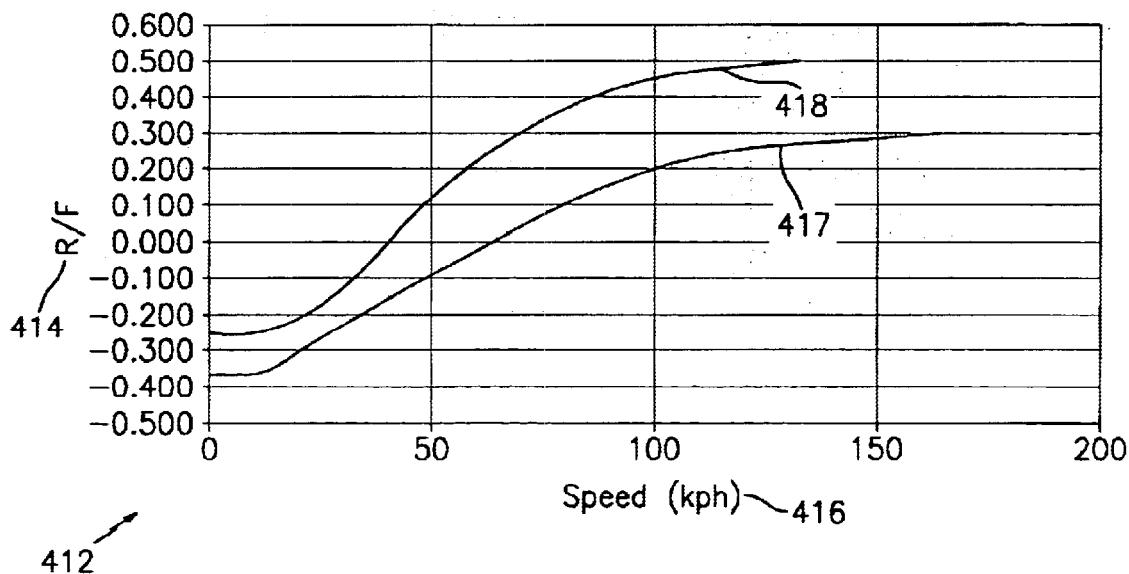
FIG. 4 depicts a graphical representation of gain factors for implementing the present invention.
Figure 5:
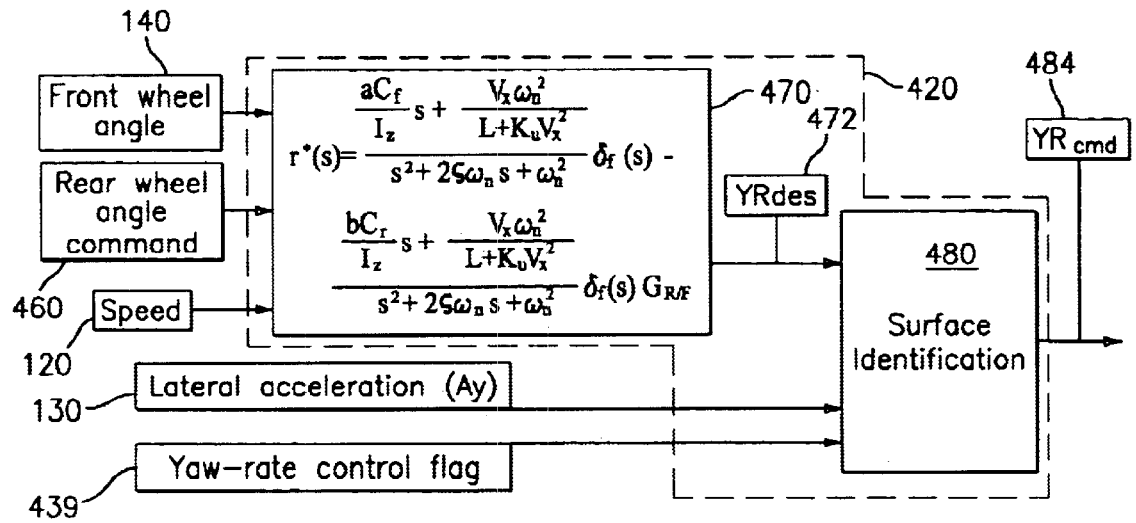
FIG. 5 depicts a block diagram of a yaw rate command interpreter (YRCI) process for use in the control system of FIG. 3.
Figure 6:
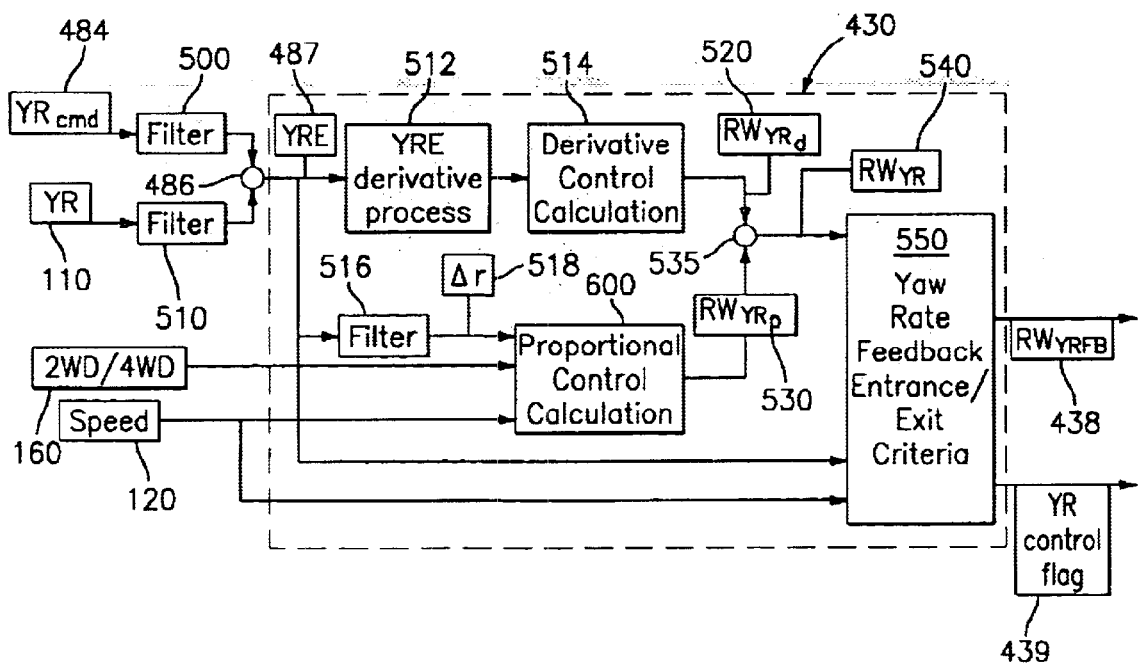
FIG. 6 depicts a block diagram of a yaw rate feedback (YRFB) process for use in the control system of FIG. 3.
Figure 7:
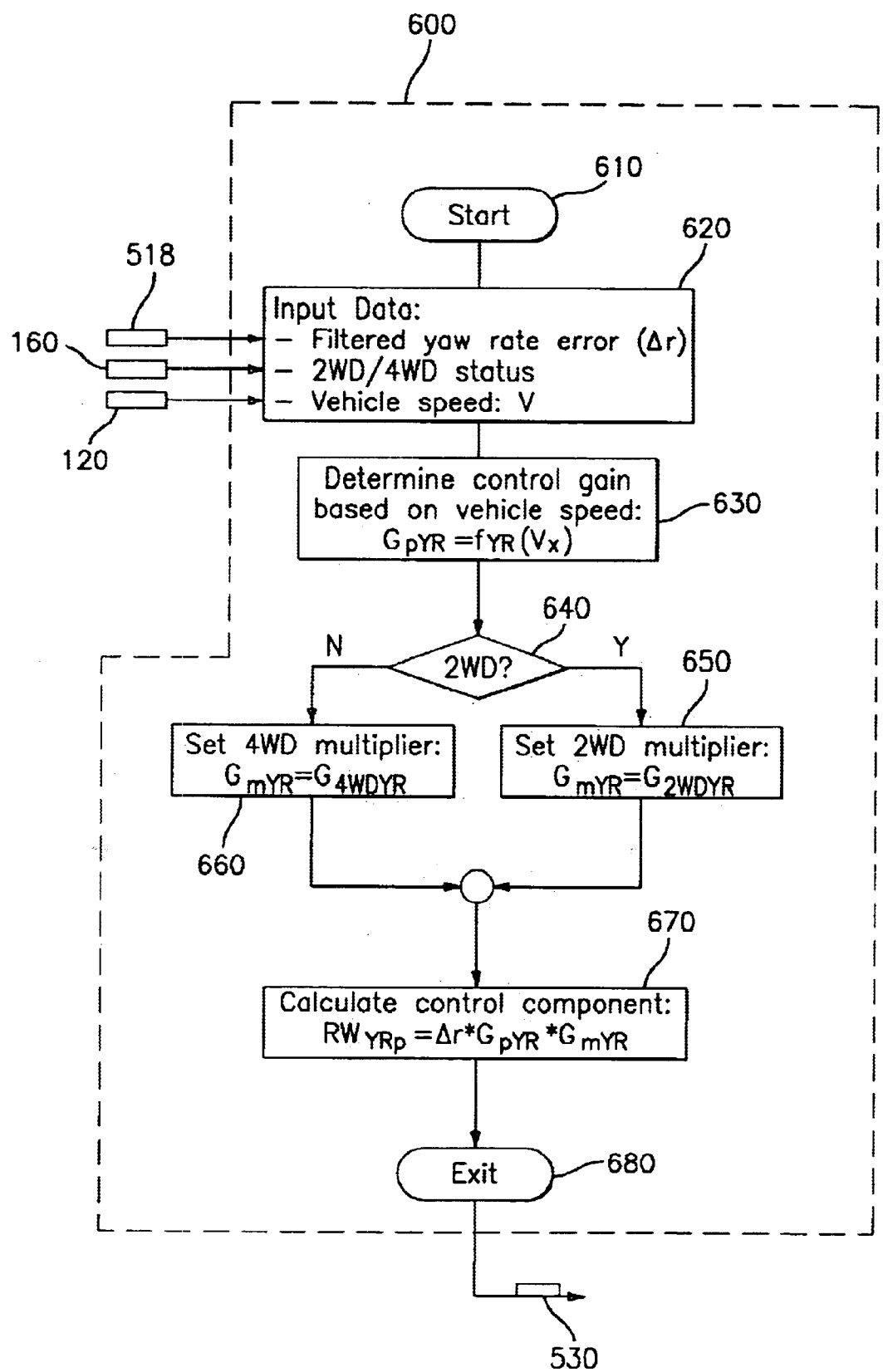
FIG. 7 depicts a flowchart of a proportional control calculation process for use in the process of FIG. 6.
Figure 8:
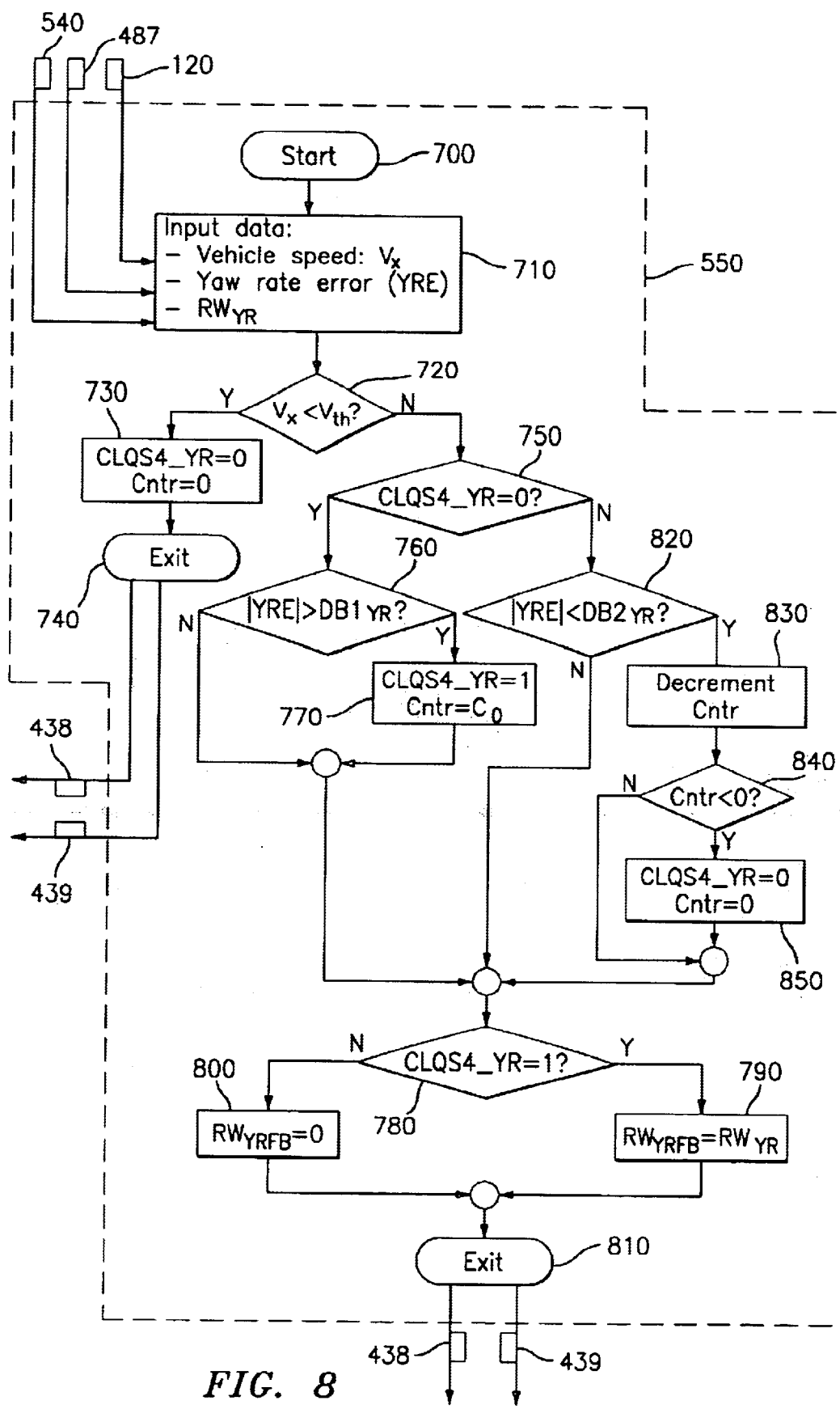
FIG. 8 depicts a flowchart of a yaw rate feedback entrance/exit criteria process for use in the process of FIG. 6.
Figure 9:
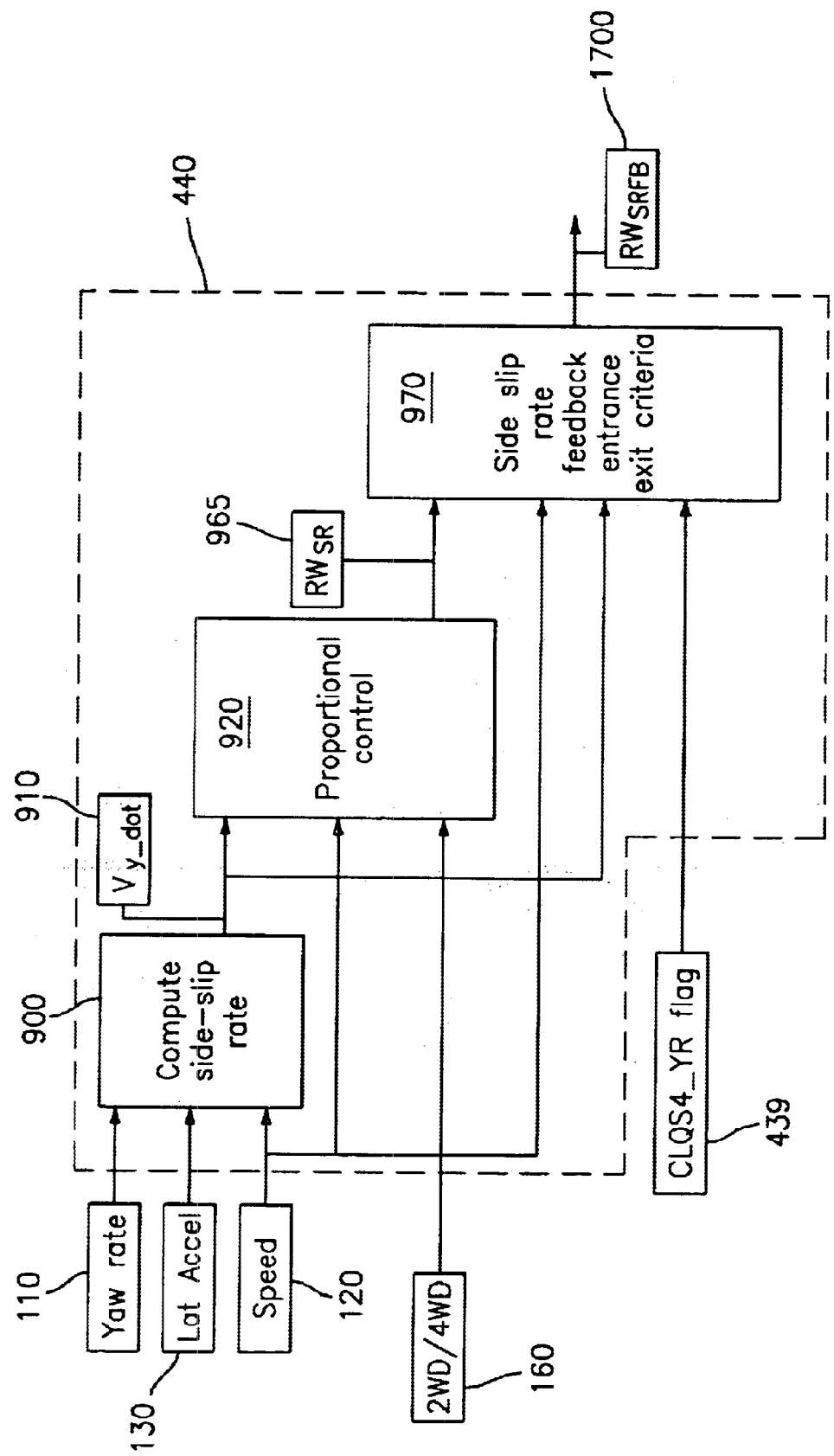
FIG. 9 depicts a block diagram of a side-slip rate feedback (SRFB) process for use in the control system of FIG. 3.
Figure 10:
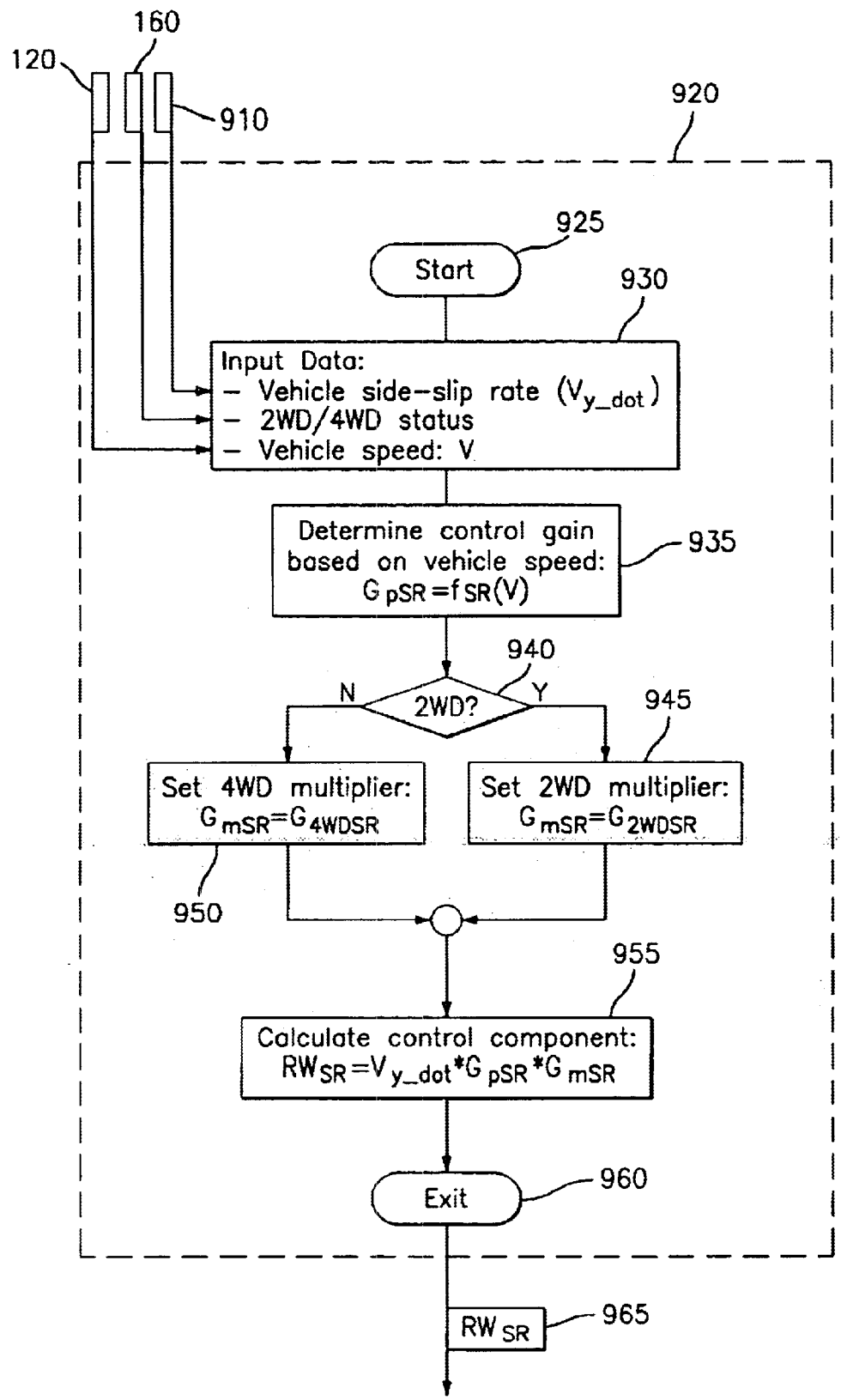
FIG. 10 depicts a flowchart of a proportional control calculation process for use in the process of FIG. 9.
Figure 11:
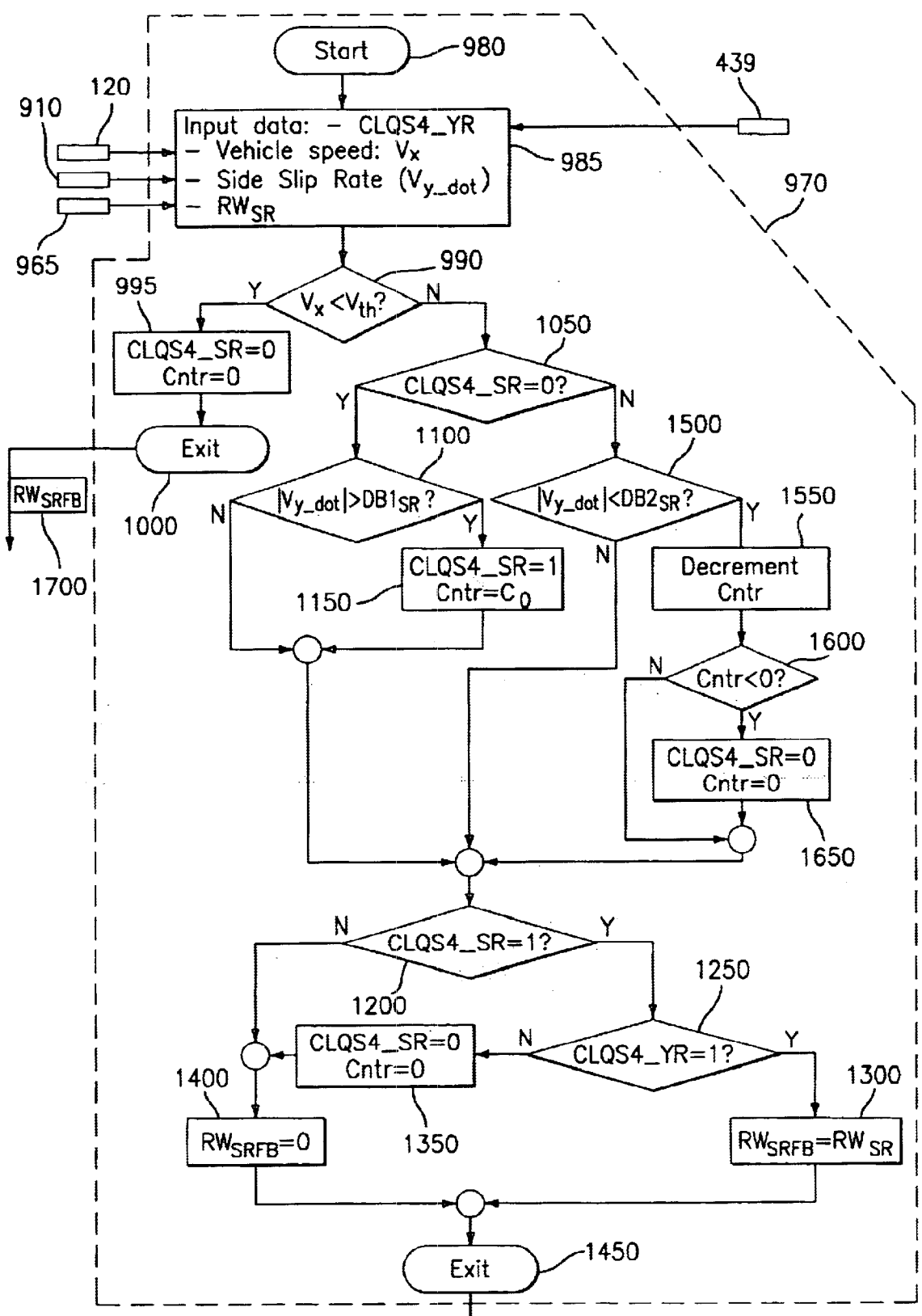
FIG. 11 depicts a flowchart of a side-slip rate feedback entrance/exit criteria process for use in the process of FIG. 9.

In general, FIGS. 2–11 depict a series of flowcharts and block diagrams that represent the logic that is implemented by controller 200. FIG. 2 depicts a generalized flowchart of the process 300 for implementing the present invention, while FIG. 3 depicts the block diagram 400 of a control system for implementing the present invention. The block diagram of FIG. 3 is broken up into sub-processes that are depicted by FIGS. 5, 6, and 9. FIG. 5 depicts a block diagram of a yaw rate command interpreter (YRCI) process, FIG. 6 depicts a block diagram of a yaw rate feedback (YRFB) process, and FIG. 9 depicts a block diagram of a side-slip rate feedback (SRFB) process. Control logic passes to each of the sub-processes as appropriate and then returns to the main process of FIG. 3. The sub-processes depicted by FIGS. 6 and 9 have sub-sub-processes as depicted by FIGS. 7, 8 and 10, 11, respectively. FIG. 7 depicts a flowchart of a proportional control calculation process used in the process of FIG. 6, FIG. 8 depicts a flowchart of a yaw rate feedback entrance/exit criteria process used in the process of FIG. 6, FIG. 10 depicts a flowchart of a proportional control calculation process used in the process of FIG. 9, and FIG. 11 depicts a flowchart of a side-slip rate feedback entrance/exit criteria process used in the process of FIG. 9. The graphical representation of gain factors depicted in FIG. 4 is used in the open-loop control process of FIG. 3.

Control Algorithm

Referring to FIG. 2, a generalized flowchart 300 for implementing the present invention begins at start 310, which includes an initialization procedure that resets all of the system flags, registers and timers. Control logic then enters control loop 320, which includes the steps of, sensing 330 vehicle parameters from the various sensors discussed above, and more specifically for sensing the vehicle speed, the front wheel steering angle, the vehicle yaw rate, and the vehicle lateral acceleration, determining 340 control gain factors from, for example, look-up tables, determining 345 a desired vehicle dynamic response in response to a vehicle parameter, such as vehicle velocity, for example, determining 350 the state of control flags, for example, the yaw rate and side-slip rate control flags, calculating 360 a control command for rear wheel steering mechanism control system 150, and actuating 370 rear wheel control mechanism 90 in response thereto. One pass through control loop 320 is completed for each sampling interval T. Process 300 ends 370 when controller 200 interrupts the process or electrical system 70 powers down.

Referring now to FIG. 3, a process 400, in block diagram representation, is presented, which represents the control loop 320 process of FIG. 2. Process 400 includes an open-loop control process, block 410, a yaw rate command interpreter process, block 420, a yaw rate feedback process, block 430, and a side-slip rate feedback process, block 440. Process 400 also depicts vehicle 10 with sensor outputs for yaw rate sensor 110, velocity sensor 120, lateral acceleration sensor 130, and front wheel steering angle sensor 140. A rear wheel steering command (RWSC) 450 provides process input to vehicle 10, whereby rear wheel steering mechanism control system 150 actuates rear wheel steering mechanism 90 in response thereto.

Open-loop Control

The open-loop control process of block 410 shown in FIG. 3 receives inputs from velocity sensor 120 and front wheel steering angle sensor 140, and provides the output open-loop rear wheel steering angle command (ORWSC) 460 as determined by $\delta_r$ from Equation 1.

$$\delta_r = R/F^* \delta_f \quad \text{Equa. 1}$$

The value for $\delta_f$ in Equation 1 is provided by front wheel steering angle sensor 140. The value for R/F in Equation 1 is obtained from the information contained in the graph depicted in FIG. 4, which may be provided by a curve fit equation or a look-up table (not shown). Referring now to FIG. 4, a graph 412 depicting R/F 414 as a function of vehicle speed 416 is shown for two conditions; non-trailering 417 and trailering 418. Trailer mode selection switch 170, suitably located for access by a driver, provides controller 200 with information regarding the trailering condition. Provided with a trailering mode 417, 418 from switch 170, the vehicle speed 416 from sensor 120, and the front wheel steering angle $\delta_f$ from sensor 140, controller 200 determines an appropriate R/F from FIG. 4, and applies Equation 1 to determine a value $\delta_r$ for the open-loop rear wheel steering command 460 output.

As shown in FIG. 4, the value of R/F for both trailering and non-trailering modes is negative for vehicle speeds less than approximately 35-kph and positive for vehicle speeds greater than approximately 65-kph. Where the R/F ratio is positive, the open-loop rear wheel steering is said to be in-phase with, or steered in the same direction as, the front wheels. Where the R/F ratio is negative, the open-loop rear wheel steering is said to be out-of-phase with, or steered in the opposite direction to, the front wheels. With such open-loop rear wheel steering, the vehicle stability can be enhanced at both low and high speeds. However, additional vehicle stability enhancement can be achieved by combining the open-loop rear wheel steering control with yaw rate feedback and side-slip rate feedback controls, as discussed below.

Yaw Rate Command Interpreter

The yaw rate command interpreter (YRCI) process of block 420, shown in FIGS. 3 and 5, includes a desired yaw rate (YRdes) process, block 470, and a surface identification (SID) process, block 480.

Referring now to FIG. 5, the YRdes process of block 470 receives inputs from velocity sensor 120, front wheel steering angle sensor 140, open-loop rear wheel steering command 460, and provides the output, desired yaw rate (YRdes) 472, in accordance with Equation 2 and FIG. 5.

$$r^*(s) = \frac{\frac{aC_f}{I_z}s + \frac{V_x \omega_n^2}{L + K_u V_x^2}}{s^2 + 2\zeta\omega_n s + \omega_n^2}\delta_f(s) - \frac{\frac{bC_r}{I_z}s + \frac{V_x \omega_n^2}{L + K_u V_x^2}}{s^2 + 2\zeta\omega_n s + \omega_n^2}\delta_f(s)G_{R/F}. \quad \text{Equa. 2}$$

As discussed above and depicted in FIG. 5, Equation 2 calculates a value for r*(s), which is YRdes expressed in the frequency domain. Equation 2 is alternatively referred to as a frequency domain form of a high-coefficient yaw-rate reference model, which represents the desired yaw rate under dry road surface conditions, alternatively referred to as high coefficient (high friction coefficient) surface conditions. Controller 200 applies the respective sensor inputs and known vehicle parameters to Equation 2 and provides process output, YRdes 472. To account for low coefficient road surface conditions, such as when the road is wet or icy, the desired yaw rate needs to be modified using a surface identification (SID) process.

The SID process of block 480 in FIG. 3 receives inputs from lateral acceleration sensor 130, YRdes 472, and yaw rate control flag (CLQS4_YR) 439, which will be discussed below in reference to FIG. 8, and provides process output, yaw rate command (YRcmd) 484, in accordance with Equations 3 and 4, and FIG. 8.

$$YRcmd = YRdes^*\mu e, \text{ when } CLQS4\_YR=1, \quad \text{Equa. 3}$$

$$YRcmd = YRdes, \text{ when } CLQS4\_YR=0. \quad \text{Equa. 4}$$

When yaw rate control flag is (0), then YRcmd is equal to YRdes, per Equation 4. When yaw rate control flag is (1), then YRcmd is equal to YRdes multiplied by a surface identification estimate, μe, per Equation 3. When used as in Equation 3, surface identification estimation, μe, acts as a control gain factor. Surface identification estimate, μe, is determined in accordance with the process described in commonly assigned U.S. Pat. No. 6,125,319 entitled "Brake System Control Method Responsive to Measured Vehicle Acceleration", filed Aug. 17, 1998 (the '319 patent), and more particularly depicted in FIG. 4 and described at column 8 through column 10 of the '319 patent, which is herein incorporated by reference in its entirety, and is generally described as a process for estimating the road surface adhesion characteristic. Controller 200 applies the sensor input 130, intermediate control calculation 472 and control flag condition 439, to Equations 3 and 4, and provides process output, YRcmd 484.

Yaw Rate Feedback

The yaw rate feedback process of block 430, shown in FIGS. 3 and 6, receives inputs from velocity sensor 120, 2WD/4WD mode selection switch 160, and yaw rate integrator 486, and provides the process outputs of rear wheel yaw rate feedback ($RW_{YRFB}$) 438 and yaw rate control flag (CLQS4_YR) 439, in accordance with Equations 9 and 10, and FIGS. 6–8, as discussed below.

Yaw integrator 486, as shown in FIGS. 3 and 6, receives inputs from yaw rate sensor 110 and from the process of block 420, which is YRcmd 484, and provides the output of yaw rate error (YRE) 487, in accordance with Equation 5.

$$YRE = YR - Yrcmd. \quad \text{Equa. 5.}$$

FIG. 6 depicts an expanded version of the yaw rate feedback process of block 430 in FIG. 3. Referring now to FIG. 6, integrator input signals YRcmd 484 and YR 110 are first filtered by filtering processes 500, 510 sufficient to remove excessive noise. The filtered YRE 487 is then used to form a derivative control component for rear wheel steering ($RW_{YRd}$) 520 and a proportional control component for rear wheel steering ($RW_{YRp}$) 530. Regarding the derivative control component, the filtered yaw rate error YRE 487 is first processed for its time derivative 512, which is followed by a process 514 to calculate the derivative control component by multiplying the filtered time derivative of YRE by a constant gain factor $G_d$, for example 0.01, in accordance with Equation 6, to provide the derivative control component $RW_{YRd}$ 520.

$$RW_{YRd} = YRE' * G_d. \quad \text{Equa. 6.}$$

Regarding the proportional control component, the filtered yaw rate error YRE 487 is first additionally filtered 516 to remove any remaining undesirable noise, thereby providing a filtered yaw rate error Δr 518. The proportional control component 530 is then calculated according to the process of block 600 and the flowchart of FIG. 7.

Referring now to FIG. 7, the process of block 600 starts at 610 and then receives inputs 620 from the filtered yaw rate error 518, the 2WD/4WD mode selection switch 160, and vehicle speed sensor 120. Controller 200 then enters, or accesses, look-up Table-1, shown below, to determine 630 a proportional yaw rate control gain $G_{pYR}$ based on vehicle speed $V_x$.

TABLE 1

| | $f_{YR}(V_x)$ | | | | | | | |
|---|---|---|---|---|---|---|---|---|
| Vehicle Speed (kph) $V_x$ | 0 | 24 | 29 | 34 | 40 | 60 | 80 | 100 | 120 |
| Gain $G_{pYR}$ | 0 | 0.326 | 0.618 | 0.101 | 0.07 | 0.055 | 0.055 | 0.03 | 0 |

Controller 200 performs interpolation or extrapolation calculations on the values of Table-1 as necessary to obtain intermediate or out-of-bound values. It will be appreciated in later references to look-up tables, that the interpolation/extrapolation operation performed by controller 200 on Table-1 is also applicable to the analysis involving other look-up table values. Control logic then continues to block 640 where a determination is made regarding the position of the 2WD/4WD mode selection switch 160. If switch 160 is in the 2WD position, then the yaw rate gain mulitiplier $G_{mYR}$ is set 650 to the 2WD multiplier in accordance with the value for $G_{2WDYR}$. If switch 160 is in the 4WD position, then the yaw rate gain multiplier $G_{mYR}$ is set 660 to the 4WD multiplier in accordance with value for $G_{4WDYR}$. After selecting either the 2WD or 4WD gain, control logic continues to block 670, where the proportional control component $RW_{YRp}$ is calculated in accordance with Equation 7.

$$RW_{YRp} = \Delta r * G_{pYR} * G_{mYR}. \quad \text{Equa. 7.}$$

The process of block 600 then exits at block 680 and control logic is sent back to the process of block 430 in FIG. 6 from whence it came.

Referring now to FIG. 6, the outputs of derivative control calculation, block 514, and proportional control calculation, block 600, are $RW_{YRd}$ 520 and $RW_{YRp}$ 530, respectively, which are added together by integrator 535 to provide $RW_{YR}$ 540 in accordance with Equation 8.

$$RW_{YR} = RW_{YRd} + RW_{Yrp}. \quad \text{Equa. 8.}$$

$RW_{YR}$ 540 is combined with YRE 487 and vehicle velocity $V_x$, from velocity sensor 120, to provide the inputs to the Yaw Rate Feedback Entrance/Exit Criteria 550. The process of block 550 follows the logical process depicted in the flowchart in block 550 of FIG. 8 and produces the outputs, $RW_{YRFB}$ (rear wheel yaw rate feedback) 438 and CLQS4_YR (yaw rate control flag) 439. The process depicted in block 550 of FIG. 8 is an expanded version of the process depicted by block 550 of FIG. 6.

Referring now to FIG. 8, the process of block 550 starts at 700 followed by the receiving of input data 710, which includes vehicle speed $V_x$ from velocity sensor 120, rear wheel yaw rate feedback $RW_{YR}$ 540, and filtered yaw rate error YRE 487. At block 720, the control logic determines whether the vehicle speed $V_x$ is less than a predefined threshold value $V_{th}$. If the conditions of block 720 are satisfied, control logic passes to block 730, which sets the yaw rate control flag CLQS4_YR to (0) and sets the logic counter Cntr to (0). After block 730, control logic exits the process of block 550 at block 740, and returns to the process of block diagram 430 in FIG. 6 from whence it came. When exiting the process of block 550 at block 740, the yaw rate control flag CLQS4_YR 439 is set and the rear wheel yaw rate feedback $RW_{YRFB}$ 438 is left unchanged. If at block 720, the conditions are not satisfied, control logic passes to block 750 where it is determined whether CLQS4_YR is set to (0) or not. If the conditions of block 750 are satisfied, control logic passes to block 760 where it is determined whether the absolute value of yaw rate error |YRE| is greater than a first yaw rate deadband threshold $DB1_{YR}$. The first yaw rate deadband threshold $DB1_{YR}$ is obtained by controller 200 entering look-up Table-2, shown below, with the vehicle velocity $V_x$ and returning with the gain value $DB1_{YR}$.

TABLE 2

| $DB1_{YR}$ | | | | | | | |
|---|---|---|---|---|---|---|---|
| Vehicle Speed (kph) $V_x$ | 0 | 10 | 25 | 30 | 60 | 80 | 100 |
| Gain $DB1_{YR}$ | 15 | 12 | 9 | 8 | 7 | 8 | 9 |

If the conditions of block 760 are satisfied, control logic passes to block 770, which sets the yaw rate control flag CLQS4_YR to (1) and sets the logic counter Cntr to the predefined value $C_0$. After block 770, control logic passes to block 780 where it is determined whether CLQS4_YR is set to (1) or not. If the conditions of block 780 are satisfied, control logic passes to block 790 where $RW_{YRFB}$ is set equal to $RW_{YR}$ in accordance with Equation 9.

$$RW_{YRFB}=RW_{YR}, \text{ when } CLQS4\_YR=1. \quad \text{Equa. 9.}$$

If the conditions of block 780 are not satisfied, control logic passes to block 800 where $RW_{YRFB}$ is set equal to (0) in accordance with Equation 10.

$$RW_{YRFB}=0, \text{ when } CLQS4\_YR=0. \quad \text{Equa. 10.}$$

After blocks 790 and 800, control logic exits the process of block 550 at block 810, and returns to the process of block diagram 430 in FIG. 6 from whence it came. If the conditions at block 760 are not satisfied, control logic passes to block 780 and proceeds as discussed above. If the conditions of block 750 are not satisfied, control logic passes to block 820 where it is determined whether the absolute value of yaw rate error |YRE| is less than a second yaw rate deadband threshold $DB2_{YR}$. The second yaw rate deadband threshold $DB2_{YR}$ is obtained by controller 200 entering look-up Table-3, shown below, with the vehicle velocity $V_x$ and returning with the gain value $DB2_{YR}$.

TABLE 3

| $DB2_{YR}$ | | | | | |
|---|---|---|---|---|---|
| Vehicle Speed (kph) $V_x$ | 0 | 30 | 60 | 80 | 100 |
| Gain $DB2_{YR}$ | 11 | 5 | 3 | 4 | 5 |

If the conditions of block 820 are satisfied, control logic passes to block 830 where logic counter Cntr is decremented, and then to block 840 where it is determined whether logic counter Cntr is less than (0). If the conditions of block 840 are satisfied, then block 850 sets the yaw rate control flag CLQS4_YR to (0) and sets the logic counter Cntr to (0). After block 850, control logic passes to block 780 and proceeds as discussed above. When exiting the process of block 550 at block 810, both the yaw rate control flag CLQS4_YR 439 and the rear wheel yaw rate feedback $RW_{YRFB}$ 438 are set. The outputs of block 550 in FIGS. 6 and 8, and block 430 in FIG. 6, are rear wheel yaw rate feedback $RW_{YRFB}$ 438 and yaw rate control flag CLQS4_YR 439. The logic flow at this point is best seen by now referring back to block 430 of FIG. 3, which shows outputs 438, 439. Output 439 (yaw rate control flag CLQS4_YR) is one of the inputs to block 440, side-slip rate feedback SRFB. Other inputs to block 440 include vehicle yaw rate from sensor 110, vehicle velocity from sensor 120, vehicle lateral acceleration from sensor 130, and 2WD/4WD mode from switch 160. The side-slip rate feedback (SRFB) process of block 440 is best seen by now referring to FIG. 9.

Block 440 in FIG. 9 shows inputs from sensors 110, 120 and 130, mode switch 160, and control flag 439. The side-slip rate $V_{y\_dot}$ 910 is computed at block 900 according to Equation 11, and is used as an input to the proportional control algorithm of block 920.

$$V_{y\_dot}=A_y-YR*V_x. \quad \text{Equa. 11.}$$

Other inputs to block 920 include $V_x$ from sensor 120 and 2WD/4WD mode selection from switch 160. The proportional control algorithm of block 920 is best seen by now referring to FIG. 10, where controller 200 starts at block 925, receives inputs at block 930 from 120, 160 and 910, and continues to block 935 where proportional side-slip rate control gain $G_{pSR}$ is determined by controller 200 entering look-up Table-4, shown below, with information relating to vehicle speed $V_x$.

TABLE 4

| $f_{SR}(V_x)$ | | | | | | | |
|---|---|---|---|---|---|---|---|
| Vehicle Speed (kph) $V_x$ | 0 | 19 | 43 | 62 | 82 | 96 | 120 |
| Gain $G_{pSR}$ | 0 | 0.28 | 0.46 | 0.87 | 1.05 | 1.07 | 1.1 |

Controller 200 performs interpolation or extrapolation calculations on the values of Table-4 as necessary. The process of block 920 continues to block 940 where it is determined whether 2WD/4WD mode selection switch 160 is set in 2WD mode or not. If the conditions of block 940 are satisfied, control logic passes to block 945 where a side-slip rate gain multiplier $G_{mSR}$ is set equal to the side-slip rate gain multiplier $G_{2WDSR}$ for 2WD driving mode status. If the conditions of block 940 are not satisfied, control logic passes to block 950 where a side-slip rate gain multiplier $G_{mSR}$ is set equal to the side-slip rate gain multiplier $G_{4WDSR}$ for 4WD driving mode status. After blocks 945 and 950, control logic passes to block 955 where rear wheel side-slip rate component $RW_{SR}$ is calculated in accordance with Equation 12.

$$RW_{SR}=V_{y\_dot}*G_{pSR}*G_{mSR}. \quad \text{Equa. 12.}$$

After block 955, control logic exits, block 960, the process of block 920 and returns to the process of block 440 in FIG. 9 from whence it came. The output of block 920 is rear wheel side-slip rate component $RW_{SR}$ 965, as shown in FIGS. 9 and 10.

Referring to FIGS. 9 and 11, side-slip rate feedback entrance/exit criteria process, depicted by block 970, has the inputs rear wheel side-slip rate component $RW_{SR}$ 965, vehicle speed from sensor 120, side-slip rate $V_{y\_dot}$ 910, and yaw rate control flag CLQS4_YR 439. Referring now to FIG. 11, controller 200 starts the process at block 980, receives the noted inputs at block 985, and then proceeds to block 990 where the control logic determines whether the vehicle velocity $V_x$ is less than a predefined velocity threshold $V_{th}$. If the conditions of block 990 are satisfied, control logic passes to block 995 where the side-slip rate control flag CLQS4_SR is set to (0) and the logic counter Cntr is set to (0). After block 995, control logic exits the process of block 970 at block 1000 and returns to the process of block 440 in FIG. 9 from whence it came. When exiting the process of block 970 at block 1000, the value of rear wheel side-slip rate feedback $RW_{SRFB}$ 1700 remains unchanged. If the conditions of block 990 are not satisfied, control logic passes to block 1050 where it is determined whether side-slip rate control flag CLQS4_SR is set to (0) or not. If the conditions of block 1050 are satisfied, control logic passes to block 1100 where it is determined whether the absolute value of $V_{y\_dot}$ is greater than a first side-slip rate deadband threshold $DB1_{SR}$. The first side-slip rate deadband threshold $DB1_{SR}$ is obtained by controller 200 entering look-up Table-5, shown below, with the vehicle velocity $V_x$ and returning with the gain value $DB1_{SR}$.

TABLE 5

| | $DB1_{SR}$ | | | | | | | |
|---|---|---|---|---|---|---|---|---|
| Vehicle Speed (kph) $V_x$ | 0 | 10 | 25 | 30 | 48 | 56 | 80 | 100 |
| Gain $DB1_{SR}$ | 0 | 1 | 2 | 3 | 5 | 4 | 2.9 | 4 |

If the conditions of block 1100 are satisfied, control logic passes to block 1150 where CLQS4_SR is set to (1) and control counter Cntr is set to the predefined value $C_0$. After block 1150, control logic passes to block 1200. If the conditions of block 1100 are not satisfied, control logic passes to block 1200. At block 1200, controller 200 determines whether CLQS4_SR is set to (1) or not. If the conditions of block 1200 are satisfied, control logic passes to block 1250 where it is determined whether CLQS4_YR is set to (1) or not. If the conditions of block 1250 are satisfied, control logic passes to block 1300 where $RW_{SRFB}$ is set equal to $RW_{SR}$ in accordance with Equation 13.

$RW_{SRFB}=RW_{SR}$, when $CLQS4\_SR=1$. Equa. 13.

If the conditions of block 1250 are not satisfied, control logic passes to block 1350 where CLQS4_SR is set to (0) and control counter Cntr is set to (0). After block 1350, control logic passes to block 1400 where $RW_{SRFB}$ is set equal to (0) in accordance with Equation 14.

$RW_{SRFB}=0$, when $CLQS4\_SR=0$. Equa. 14.

If the conditions of block 1200 are not satisfied, control logic passes to block 1400 and proceeds as discussed above. After blocks 1300 and 1400, control logic exits the process of block 970 at block 1450. If the conditions of block 1050 are not satisfied, control logic passes to block 1500 where it is determined whether the absolute value of $V_{y\_dot}$ is less than a second side-slip rate deadband threshold $DB2_{SR}$. The second side-slip rate deadband threshold $DB2_{SR}$ is obtained by controller 200 entering look-up Table-6, shown below, with the vehicle velocity $V_x$ and returning with the gain value $DB2_{SR}$.

TABLE 6

| | $DB2_{SR}$ | | | | | | | |
|---|---|---|---|---|---|---|---|---|
| Vehicle Speed (kph) $V_x$ | 0 | 10 | 25 | 30 | 48 | 60 | 80 | 100 |
| Gain $DB2_{SR}$ | 0 | 0.7 | 1.2 | 1.7 | 3 | 2.2 | 1.5 | 2.2 |

If the conditions of block 1500 are satisfied, control logic passes to block 1550 where control counter Cntr is decremented, and then to block 1600 where it is determined whether control counter Cntr is less that (0). If the conditions of block 1600 are satisfied, control logic passes to block 1650 where CLQS4_SR is set to (0) and control counter Cntr is set to (0). After block 1650, control logic passes to block 1200 and proceeds as discussed above. If the conditions of block 1600 are not satisfied, control logic passes to block 1200 and proceeds as discussed above. When the process of block 970 exits at block 1450, the value of rear wheel side-slip rate feedback $RW_{SRFB}$ 1700 is set to either (0) or $RW_{SR}$ and the control logic passes back to the process of block 440 in FIG. 9 from whence it came. Referring now to FIG. 9, the process of block 440 concludes with the output $RW_{SRFB}$ 1700, as shown in FIGS. 9 and 3.

Referring now back to FIG. 3, integrator 1750 receives the inputs rear wheel yaw rate feedback ($RW_{YRFB}$) 438, open-loop rear wheel steering angle command (ORWSC) 460, and rear wheel side-slip rate feedback ($RW_{SRFB}$) 1700, and provides the output rear wheel steering command (RWSC) 450 in accordance with Equation 15.

$RWSC=ORWSC+RW_{YRFB}+RW_{SRFB}$ (see FIG. 3). Equa. 15.

The rear wheel steering command (RWSC) 450 is used by controller 200 for controlling rear wheel steering mechanism control system 150 as it adjusts rear wheel steering mechanism 90 in accordance with the control logic herein described.

Vehicle Response Generally

Figure 12:
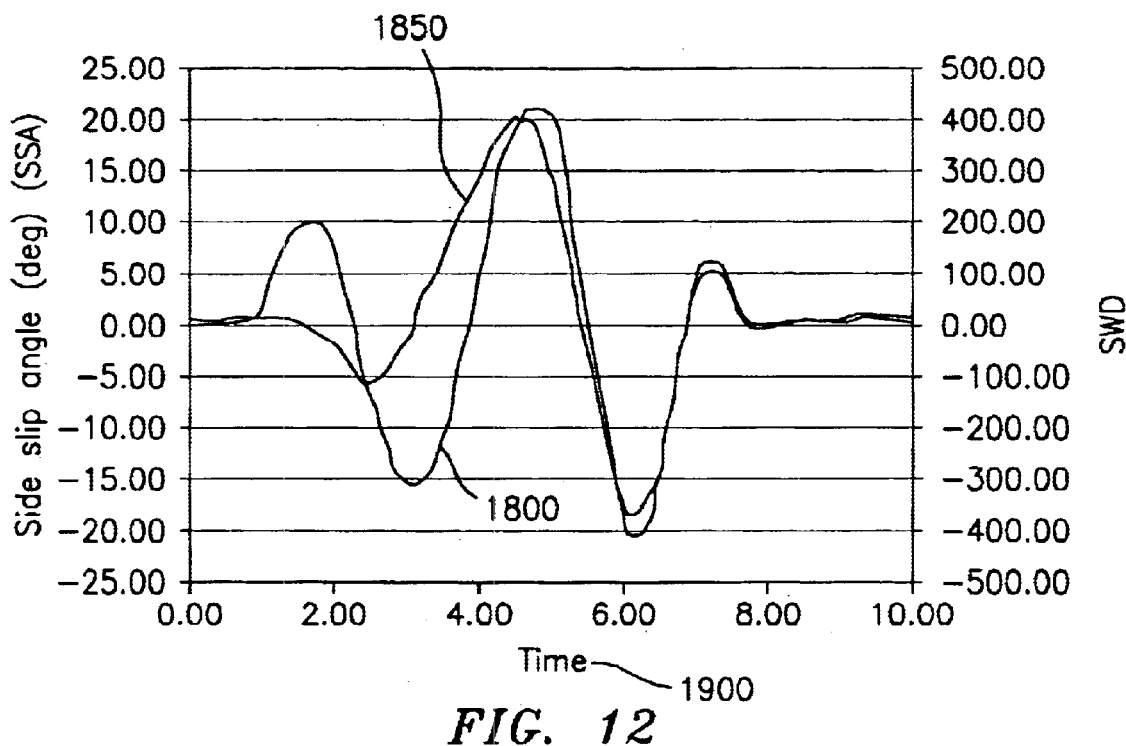
FIG. 12 depicts a graphical representation of a vehicle performance responsive to a feedforward rear wheel steering control.
Figure 13:
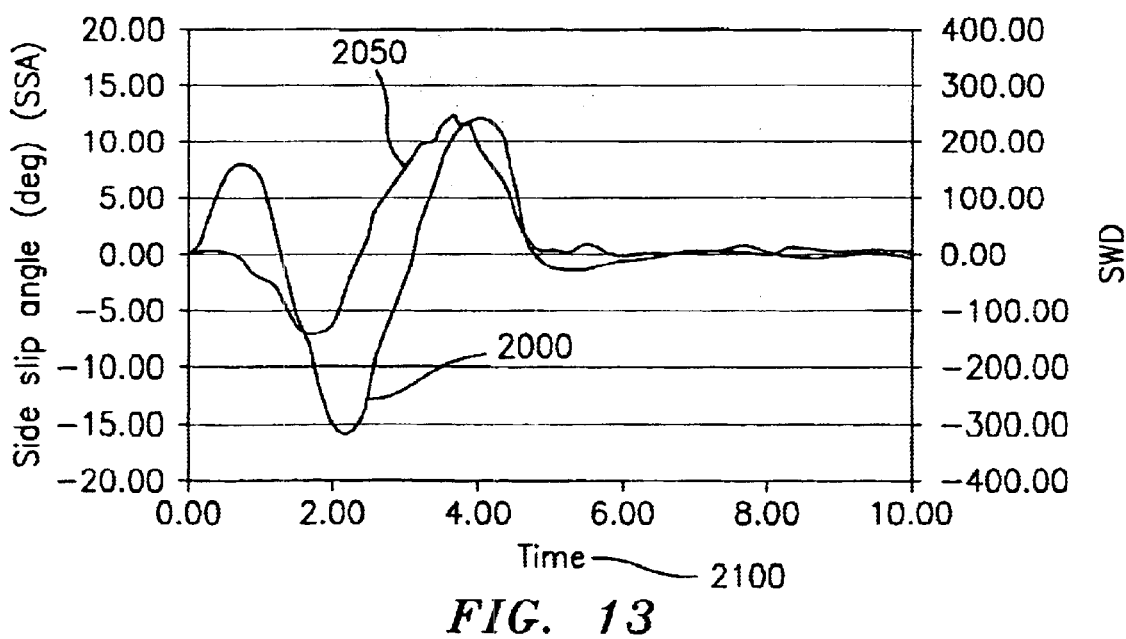
FIG. 13 depicts a graphical representation of a vehicle performance responsive to rear wheel steering control in accordance with the present invention.

Employing the open-loop rear wheel steering angle command (ORWSC) in combination with the rear wheel yaw rate feedback ($RW_{YRFB}$) and rear wheel side-slip rate feedback ($RW_{SRFB}$) in accordance with this invention, a reduction in steering wheel displacement (SWD) and a reduction in vehicle side-slip angle (SSA) during vehicle maneuvering, such as in a double-lane change maneuver on snow at 40 miles per hour, can be achieved, as illustrated by FIGS. 12 and 13, which depict graphs of steering wheel displacement (SWD), expressed in degrees, and side-slip angle (SSA), expressed in degrees, as a function of time.

FIG. 12 depicts the response of a first vehicle undergoing the aforementioned maneuver where the first vehicle has rear wheel steering controlled only by an open-loop rear wheel steering angle command. As can be seen in FIG. 12, the peak SWD 1800 is approximately 420-degrees, and the peak SSA 1850 is approximately 20-degrees.

In comparison, FIG. 13 depicts the response of a second vehicle undergoing the same maneuver where the second vehicle has rear wheel steering controlled in accordance with the present invention, as depicted in FIGS. 2–11. As can be seen in FIG. 13, the peak SWD 2000 is approximately 315-degrees, and the peak SSA 2050 is approximately 13-degrees, a reduction of 25% and 35%, respectively, as compared to the response of the first vehicle.

In accordance with the present invention, vehicle directional stability during maneuvering can be achieved without differential braking, thereby enabling a vehicle stability enhancement (VSE) system to provide a corrective yaw moment to a vehicle without a reduction in vehicle speed, which would result from a controlled differential braking condition.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A vehicle stability enhancement system for a vehicle having at least one vehicle subsystem, comprising:
    at least one sensor for sensing at least one vehicle parameter;
    at least one vehicle control system for adjusting the at least one vehicle subsystem, said at least one vehicle control system comprising a rear wheel steering control system;
    at least one memory comprising at least one set of gain factors; and
    a controller responsive to said at least one sensor and said at least one set of gain factors for controlling said at least one vehicle control system;
    wherein said rear wheel steering control system is responsive to a rear wheel steering angle command from said controller;
    wherein said rear wheel steering angle command is responsive to an open-loop rear wheel steering angle control command, a yaw rate feedback command and a side-slip rate feedback command;
    wherein said rear wheel steering angle command is responsive to at least one of a 2WD/4WD mode selection switch and a trailer mode selection switch, and is responsive in one way to said trailer mode selection switch being in a non-trailering mode position and in a second different way to said trailer mode selection switch being in a trailering mode position.

2. The vehicle stability enhancement system of claim 1, wherein said at least one memory further comprises:
    a look up table comprising the ratio of rear wheel steering angle command to front wheel steering angle as a function of vehicle velocity.

3. The vehicle stability enhancement system of claim 1, wherein said at least one memory further comprises:
    at least one of an equation and a look up table defining the ratio of rear wheel steering angle to front wheel steering angle (R/F) as a function of vehicle velocity;
    wherein said R/F ratio has a first value in response to said trailer mode selection switch being in a non-trailering mode position, and a second different value in response to said trailer mode selection switch being in a trailering mode position.

4. The vehicle stability enhancement system of claim 3, wherein said first value is less than said second value at a given vehicle velocity.

5. A vehicle stability enhancement system for a vehicle having at least one vehicle subsystem, comprising:
    at least one sensor for sensing at least one vehicle parameter;
    at least one vehicle control system for adjusting the at least one vehicle subsystem, said at least one vehicle control system comprising a rear wheel steering control system;
    at least one memory comprising at least one set of gain factors; and
    a controller responsive to said at least one sensor and said at least one set of gain factors for controlling said at least one vehicle control system;
    wherein said at least one memory further comprises:
        a yaw rate control flag for indicating the state of the vehicle yaw rate relative to a threshold value wherein the state of said yaw rate control flag is set to a first defined value in response to an absolute value of the vehicle yaw rate error being greater than a first yaw rate threshold value; and
        a side-slip rate control flag for indicating the state of the vehicle side-slip rate relative to a threshold value.

6. The vehicle stability enhancement system of claim 5, wherein the state of said side-slip rate control flag is set to a second defined value in response to an absolute value of the vehicle side-slip rate being greater than a first side-slip rate threshold value.

7. The vehicle stability enhancement system of claim 6, wherein the second defined value is one.

8. The vehicle stability enhancement system of claim 6, wherein said side-slip rate control flag is responsive to said yaw rate control flag.

9. The vehicle stability enhancement system of claim 5, wherein said side-slip rate control flag is responsive to said yaw rate control flag.

10. The vehicle stability enhancement system of claim 5, wherein the first defined value is one.

11. A method for controlling a vehicle stability enhancement system in a vehicle having at least one vehicle subsystem, comprising:
    sensing at least one vehicle parameter;
    determining at least one control gain factor in response to the at least one vehicle parameter;
    determining at least one desired vehicle dynamic response in response to the at least one vehicle parameter;
    determining the state of at least one control flag in response to the at least one vehicle parameter;
    calculating at least one control command in response to the at least one control gain factor and the at least one control flag, said calculating comprising calculating a rear wheel steering angle command responsive to at least one of a 2WD/4WD mode selection switch and a trailer mode selection switch, wherein said rear wheel steering angle command is responsive in one way to said trailer mode selection switch being in a non-trailering mode position, and in a second different way to said trailer mode selection switch being in a trailering mode position; and
    actuating a rear wheel steering control system in response to said at least one control command.

12. The method of controlling set forth in claim 11, wherein said determining at least one control gain factor further comprises:
    determining a proportional gain factor and a derivative gain factor responsive to the at least one vehicle parameter;

wherein said determining a proportional gain factor further comprises:
accessing a look-up table for determining the proportional gain factor that is responsive to the vehicle velocity.

13. The method of controlling set forth in claim 11, wherein said calculating further comprises:
calculating a rear wheel steering angle command responsive to a trailer mode selection resulting in a first rear wheel steering angle command signal in response to said trailer mode selection being in a non-trailering mode, and a second different rear wheel steering angle command signal in response to said trailer mode selection being in a trailering mode.

14. A method for controlling a vehicle stability enhancement system in a vehicle having at least one vehicle subsystem, comprising:
sensing at least one vehicle parameter;
determining at least one control gain factor in response to the at least one vehicle parameter;
determining at least one desired vehicle dynamic response in response to the at least one vehicle parameter;
determining the state of at least one control flag in response to the at least one vehicle parameter;
calculating at least one control command in response to the at least one control gain factor and the at least one control flag; and
actuating at least one vehicle control system in response to the at least one control command for adjusting the at least one vehicle subsystem;
wherein said determining the state of at least one control flag further comprises:
determining a yaw rate control flag for indicating the state of the vehicle yaw rate relative to a threshold value; and
determining a side-slip rate control flag for indicating the state of the vehicle lateral acceleration relative to a threshold value;
wherein said determining a yaw rate control flag further comprises:
determining a yaw rate control flag to have a first defined value in response to an absolute value of the vehicle yaw rate error being greater than a first yaw rate threshold value.

15. The method of controlling set forth in claim 14, wherein said determining a side-slip rate control flag further comprises:
determining a side-slip rate control flag to have a second defined value in response to an absolute value of the vehicle side-slip rate being greater than a first side-slip rate threshold value.

16. The method of controlling set forth in claim 15, wherein the second defined value is one.

17. The method of controlling set forth in claim 15, wherein said determining a side-slip rate control flag further comprises:
determining a side-slip rate control flag responsive to the yaw rate control flag.

18. The method of controlling set forth in claim 14, wherein said determining a side-slip rate control flag further comprises:
determining a side-slip rate control flag responsive to the yaw rate control flag.

19. The method of controlling set forth in claim 14, wherein the first defined value is one.

20. A vehicle stability enhancement system for a vehicle having at least one vehicle subsystem, comprising;
a trailer mode selection switch having a non-trailering mode position and a trailering mode position;
at least one sensor for sensing at least one vehicle parameter;
at least one vehicle control system for adjusting the at least one vehicle subsystem, said at least one vehicle control system comprising a rear wheel steering control system;
at least one memory comprising at least one set of gain factors; and
a controller responsive to said trailer mode selection switch, said at least one sensor, and said at least one set of gain factors, for controlling said at least one vehicle control system;
wherein the vehicle stability enhancement system is configured to provide a first corrective yaw moment to the vehicle absent in response to said trailer mode selection switch being in the non-trailering position, and a second different corrective yaw moment to the vehicle in response to said trailer mode selection switch being in the trailering mode position.

21. The vehicle stability enhancement system of claim 20, wherein:
said first corrective yaw moment is responsive to a first ratio of rear wheel steering angle to front wheel steering angle (R/F);
said second corrective yaw moment is responsive to a second ratio of rear wheel steering angle to front wheel steering angle (R/F); and
said first ratio has a value that is less than the value of said second ratio at a given vehicle velocity.

* * * * *